United States Patent
Jung et al.

(10) Patent No.: US 11,704,015 B2
(45) Date of Patent: Jul. 18, 2023

(54) ELECTRONIC DEVICE TO DISPLAY WRITING ACROSS A PLURALITY OF LAYERS DISPLAYED ON A DISPLAY AND CONTROLLING METHOD OF ELECTRONIC DEVICE

(71) Applicant: Samsung Electronics Co., Ltd., Suwon-si (KR)

(72) Inventors: Soyoung Jung, Suwon-si (KR); Sangjin Han, Suwon-si (KR); Soyoung Shin, Suwon-si (KR); Hyunsoo Yuk, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/722,826

(22) Filed: Dec. 20, 2019

(65) Prior Publication Data
US 2020/0201538 A1 Jun. 25, 2020

(30) Foreign Application Priority Data
Dec. 24, 2018 (KR) ........................ 10-2018-0168292

(51) Int. Cl.
*G06F 3/04883* (2022.01)
*G06F 3/0481* (2022.01)
*G06F 3/04845* (2022.01)

(52) U.S. Cl.
CPC ........ *G06F 3/04883* (2013.01); *G06F 3/0481* (2013.01); *G06F 3/04845* (2013.01); *G06F 2203/04803* (2013.01)

(58) Field of Classification Search
CPC ............... G06F 3/04883; G06F 3/0481; G06F 3/04845; G06F 2203/04803; G06F 3/04886
See application file for complete search history.

(56) References Cited

U.S. PATENT DOCUMENTS 5,252,951 A * 10/1993 Tannenbaum .......... G06F 3/023
345/156
6,088,481 A * 7/2000 Okamoto .............. G06F 3/0488
345/179
(Continued)

FOREIGN PATENT DOCUMENTS

CN 110083319 8/2019
JP 2013-178701 9/2013
(Continued)

OTHER PUBLICATIONS

Extended European Search Report dated May 28, 2020 in European Patent Application No. 19219077.5.
(Continued)

*Primary Examiner* — Kieu D Vu
*Assistant Examiner* — Alvaro R Calderon, IV
(74) *Attorney, Agent, or Firm* — Staas & Halsey LLP

(57) ABSTRACT

An electronic device and a controlling method of the electronic device include a display, a memory including at least one instruction, and a processor executing the at least one instruction. The processor controls the display to display a first screen including a first layer for performing writing according to a touch interaction of a user, and based on an event for displaying a content on the first screen occurring while the first screen is displayed, controls the display to display a second screen including a second layer for displaying the content on the first layer and a third layer for performing writing according to a touch interaction of a user on the second layer on some areas of the first screen.

16 Claims, 16 Drawing Sheets

(56) References Cited

U.S. PATENT DOCUMENTS

| | | | | |
|---|---|---|---|---|
| 6,091,395 | A * | 7/2000 | DeStefano | G06F 3/0481 |
| | | | | 715/788 |
| 6,252,563 | B1 * | 6/2001 | Tada | G06F 3/038 |
| | | | | 178/18.01 |
| 6,647,145 | B1 * | 11/2003 | Gay | G06F 3/03545 |
| | | | | 178/18.01 |
| 10,521,500 | B2 | 12/2019 | Emori | |
| 2003/0214540 | A1 * | 11/2003 | Huapaya | G06F 3/04883 |
| | | | | 715/863 |
| 2004/0100454 | A1 * | 5/2004 | Kang | G06F 3/04883 |
| | | | | 345/173 |
| 2005/0267676 | A1 * | 12/2005 | Nezu | B60K 35/00 |
| | | | | 701/532 |
| 2005/0289452 | A1 * | 12/2005 | Kashi | G06F 40/169 |
| | | | | 715/232 |
| 2006/0092138 | A1 * | 5/2006 | Kim | G06F 3/04842 |
| | | | | 345/173 |
| 2006/0267967 | A1 * | 11/2006 | Hinckley | G06F 3/038 |
| | | | | 345/179 |
| 2007/0106950 | A1 * | 5/2007 | Hutchinson | G06F 3/0488 |
| | | | | 715/761 |
| 2008/0119235 | A1 * | 5/2008 | Nielsen | G06F 3/04883 |
| | | | | 455/566 |
| 2010/0079493 | A1 * | 4/2010 | Tse | G06F 3/04883 |
| | | | | 345/650 |
| 2010/0185949 | A1 * | 7/2010 | Jaeger | G06F 3/0481 |
| | | | | 715/730 |
| 2011/0185318 | A1 * | 7/2011 | Hinckley | G06F 3/04883 |
| | | | | 715/863 |
| 2011/0191704 | A1 * | 8/2011 | Hinckley | G06F 3/048 |
| | | | | 715/764 |
| 2012/0069027 | A1 * | 3/2012 | Yamazaki | G06K 9/00402 |
| | | | | 345/472.3 |
| 2012/0173983 | A1 * | 7/2012 | Song | G06F 3/04883 |
| | | | | 715/720 |
| 2012/0206471 | A1 * | 8/2012 | Sarnoff | G06T 11/60 |
| | | | | 345/581 |
| 2012/0242599 | A1 * | 9/2012 | Seo | G06F 3/1423 |
| | | | | 345/173 |
| 2012/0306782 | A1 * | 12/2012 | Seo | G06F 1/1647 |
| | | | | 345/173 |
| 2013/0305184 | A1 | 11/2013 | Kim et al. | |
| 2014/0015782 | A1 * | 1/2014 | Kim | G06K 9/00422 |
| | | | | 345/173 |
| 2014/0019905 | A1 * | 1/2014 | Kim | G06F 3/04883 |
| | | | | 715/780 |
| 2014/0047308 | A1 | 2/2014 | Chub et al. | |
| 2014/0304586 | A1 | 10/2014 | Hirabayashi | |
| 2014/0372881 | A1 * | 12/2014 | Aikawa | G06F 40/166 |
| | | | | 715/268 |
| 2015/0030249 | A1 * | 1/2015 | Zhen | G06K 9/222 |
| | | | | 382/186 |
| 2015/0055865 | A1 * | 2/2015 | Kim | G06K 9/222 |
| | | | | 382/173 |
| 2015/0058789 | A1 * | 2/2015 | Namgung | G06F 3/0488 |
| | | | | 715/781 |
| 2015/0067489 | A1 * | 3/2015 | Zotto | G06F 3/04883 |
| | | | | 715/268 |
| 2015/0100874 | A1 * | 4/2015 | Pallakoff | G06F 3/04842 |
| | | | | 715/232 |
| 2015/0286392 | A1 | 10/2015 | Paek et al. | |
| 2016/0103552 | A1 * | 4/2016 | Yang | G06F 3/0485 |
| | | | | 345/173 |
| 2016/0154555 | A1 * | 6/2016 | Perrin | G06K 9/222 |
| | | | | 715/765 |
| 2016/0357412 | A1 * | 12/2016 | Thimbleby | G06F 3/0481 |
| 2016/0357430 | A1 * | 12/2016 | Migos | G06F 3/04883 |
| 2017/0199653 | A1 * | 7/2017 | Rajasankar | G06T 3/60 |
| 2017/0277357 | A1 * | 9/2017 | Kihara | G06F 3/0425 |
| 2017/0277358 | A1 * | 9/2017 | Kihara | G06F 3/017 |
| 2017/0285920 | A1 * | 10/2017 | Hatfield | G06F 3/03545 |
| 2018/0024656 | A1 | 1/2018 | Kim et al. | |
| 2018/0095653 | A1 * | 4/2018 | Hasek | G06F 3/041 |
| 2018/0173395 | A1 | 6/2018 | Lee et al. | |
| 2019/0155895 | A1 * | 5/2019 | Buckley | G06K 9/00416 |
| 2020/0333949 | A1 | 10/2020 | Lim | |

FOREIGN PATENT DOCUMENTS

| | | |
|---|---|---|
| KR | 10-1399662 | 5/2014 |
| KR | 10-2016-0089569 | 7/2016 |
| KR | 20-2018-0000611 | 3/2018 |
| KR | 10-2018-0092679 | 8/2018 |
| KR | 10-2020-0122651 | 10/2020 |
| WO | 2014/011000 | 1/2014 |

OTHER PUBLICATIONS

International Search Report and Written Opinion of the International Searching Authority dated Apr. 14, 2020 in International Patent Application No. PCT/KR2019/018120.

European Office Action dated Dec. 7, 2021 in European Application No. 19 219 077.5; 6 pages.

\* cited by examiner

ELECTRONIC DEVICE TO DISPLAY WRITING ACROSS A PLURALITY OF LAYERS DISPLAYED ON A DISPLAY AND CONTROLLING METHOD OF ELECTRONIC DEVICE

CROSS-REFERENCE TO RELATED APPLICATION(S)

This application is based on and claims priority under 35 U.S.C. § 119(a) to Korean Patent Application No. 10-2018-0168292, filed on Dec. 24, 2018, in the Korean Intellectual Property Office, the disclosure of which is incorporated by reference herein in its entirety.

BACKGROUND

1. Field

The disclosure relates to an electronic device and a controlling method of the electronic device, and more particularly, to an electronic device which enables writing to be performed seamlessly on an entire screen of a display screen including an area for providing contents and the external area thereof, and a controlling method thereof.

2. Description of Related Art

Recent electronic devices provide various contents to users, and at the same time, provide a function enabling a user to perform writing on a display screen according to a touch interaction.

Meanwhile, according to the conventional technology, in case a user is provided with a content in the form of a sub window on a display screen while performing writing on the display screen, in order that the user can perform writing on the sub window for provision of the content, the user has to endure the inconvenience of having to acquire an image through a separate capture function, and then perform writing on the acquired image.

In addition, in the case of acquiring an image for a sub window and then performing writing on the acquired image, there is a limit that, if writing of a user is performed through the boundary between the internal area and the external area of the sub window, writing is broken on the boundary, and thus an analog experience cannot be provided to the user.

Accordingly, there is a rising demand for a technology which enables writing to be performed seamlessly on an entire screen of a display screen including an area for providing contents and the external area thereof, and thereby providing an analog experience to a user as if writing is performed on actual paper, and improving productivity of the user accordingly.

SUMMARY

Additional aspects will be set forth in part in the description which follows and, in part, will be apparent from the description, or may be learned by practice of the presented embodiments.

According to an embodiment of the disclosure for achieving the aforementioned purpose, an electronic device includes a display, a memory including at least one instruction, and a processor executing the at least one instruction. The processor controls the display to display a first screen including a first layer for performing writing according to a touch interaction of a user, and based on an event for displaying a content on the first screen occurring while the first screen is displayed, controls the display to display a second screen including a second layer for displaying the content on the first layer and a third layer for performing writing according to a touch interaction of a user on the second layer on some areas of the first screen.

Meanwhile, according to an embodiment of the disclosure for achieving the aforementioned purpose, a controlling method of an electronic device includes the steps of displaying a first screen including a first layer for performing writing according to a touch interaction of a user, and based on an event for displaying a content on the first screen occurring while the first screen is displayed, displaying a second screen including a second layer for displaying the content on the first layer and a third layer for performing writing according to a touch interaction of a user on the second layer on some areas of the first screen.

Also, according to an embodiment of the disclosure for achieving the aforementioned purpose, in a computer readable recording medium including a program executing a controlling method of an electronic device, the controlling method of an electronic device includes the steps of displaying a first screen including a first layer for performing writing according to a touch interaction of a user, and based on an event for displaying a content on the first screen occurring while the first screen is displayed, displaying a second screen including a second layer for displaying the content on the first layer and a third layer for performing writing according to a touch interaction of a user on the second layer.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
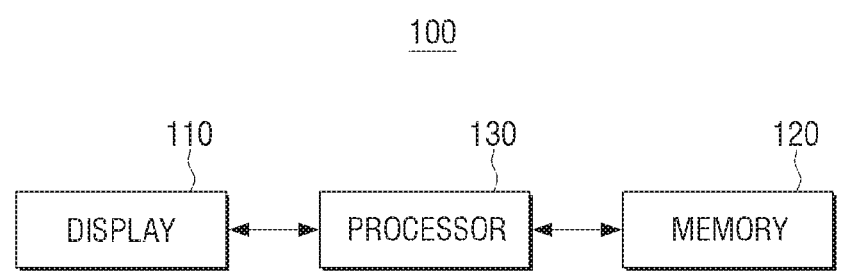
FIG. 1 is a block diagram schematically illustrating a configuration of an electronic device according to an embodiment of the disclosure.

Reference will now be made in detail to the embodiments, examples of which are illustrated in the accompanying drawings, wherein like reference numerals refer to like elements throughout. The embodiments are described below to explain the present disclosure by referring to the figures.

The disclosure was devised according to the aforementioned need, and the purpose of the disclosure is in providing an electronic device which enables writing to be performed seamlessly on an entire screen of a display screen including an area for providing contents and the external area thereof, and a controlling method thereof.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, and/or alternatives of the embodiments of the disclosure. Meanwhile, with respect to the detailed description of the drawings, similar components may be designated by similar reference numerals.

In case it is determined that in describing the disclosure, detailed explanation of related known functions or configurations may unnecessarily confuse the gist of the disclosure, the detailed explanation in that regard will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Terms used in the disclosure are used just to explain particular embodiments of the disclosure, and are not intended to limit the scope of the disclosure. Also, singular expressions include plural expressions, unless defined differently in the context.

In the disclosure, terms such as "have," "may have," "include" and "may include" should be construed as denoting that there are such characteristics (e.g.: elements such as numerical values, functions, operations and components), and the terms are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, the expressions "first," "second", and the like used in the disclosure may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Further, the expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Also, in the embodiments, 'a module' or 'a unit' may perform at least one function or operation, and may be implemented as hardware or software, or as a combination of hardware and software. Further, a plurality of 'modules' or 'units' may be integrated into at least one module and implemented as at least one processor, excluding 'a module' or 'a unit' that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Meanwhile, an electronic device according to the various embodiments of the disclosure may include at least one of, for example, a smartphone, a tablet PC, a desktop PC, a laptop PC, or a wearable device. Also, a wearable device may include at least one of an accessory-type device (e.g.: a watch, a ring, a bracelet, an ankle bracelet, a necklace, glasses, a contact lens, or a head-mounted-device (HMD)), a device integrated with fabrics or clothing (e.g.: electronic clothing), a body-attached device (e.g.: a skin pad or a tattoo), or an implantable circuit.

In addition, in some embodiments, an electronic device may include at least one of, for example, a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g.: Samsung HomeSync™, Apple TV™, or Google TV™), a game console (e.g.: Xbox™, PlayStation™), an electronic dictionary, an electronic key, a camcorder, or an electronic photo frame.

Further, in an embodiment, an electronic device may include at least one of various types of medical instruments (e.g.: various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g.: a navigation device for vessels, a gyrocompass, etc.), avionics, a security device, a head unit for a vehicle, an industrial or a household robot, a drone, an ATM of a financial institution, a point of sales (POS) of a store, or an Internet of things device (e.g.: a light bulb, various types of sensors, a sprinkler device, a fire alarm, a thermostat, a street light, a toaster, exercise equipment, a hot water tank, a heater, a boiler, etc.).

Hereinafter, embodiments according to the disclosure will be described in detail with reference to the accompanying drawings, such that those having ordinary skill in the art to which the disclosure belongs can easily carry out the disclosure.

FIG. 1 is a block diagram schematically illustrating a configuration of an electronic device according to an embodiment of the disclosure.

As illustrated in FIG. 1, the electronic device 100 according to an embodiment of the disclosure includes a display 110, a memory 120, and a processor 130.

The display 110 may output image data by control of the processor 130. Specifically, the display 110 may output an image stored in advance in the memory 120 by control of the processor 130. Also, the display 110 may display a user interface stored in the memory 120.

The display 110 may be implemented as a liquid crystal display (LCD) panel, organic light emitting diodes (OLEDs), etc. Also, the display 110 may be implemented as a flexible display, a transparent display, etc. depending on cases. However, the display 110 according to the disclosure is not limited to a specific type.

In particular, according to the disclosure, the display 110 may display a first screen and a second screen by control of the processor 130. Specifically, the display 110 may display a first screen including a first layer, and a second screen including a second layer and a third layer by control of the processor 130. Detailed explanation regarding the first screen and the second screen, and the first to third layers will be made later in the explanation regarding the processor 130.

The memory 120 may store at least one instruction regarding the electronic device 100. Also, the memory 120 may store an operating system (O/S) for driving the electronic device 100. In addition, the memory 120 may store various kinds of software programs or applications for the electronic device 100 to operate according to the various embodiments of the disclosure. Further, the memory 120 may include a semiconductor memory 120 such as a flash memory 120 or a magnetic storage medium such as a hard disk, etc.

Specifically, the memory 120 may store various kinds of software modules for the electronic device 100 to operate according to the various embodiments of the disclosure, and the processor 130 may control the operations of the electronic device 100 by executing various types of software modules stored in the memory 120. That is, the memory 120 may be accessed by the processor 130, and reading/recording/correction/deletion/update, etc. of data by the processor 130 may be performed.

Meanwhile, in the disclosure, the term memory 120 may include the memory 120, a ROM (not shown) inside the processor 130, a RAM (not shown), or a memory card (not shown) installed on the electronic device 100 (e.g., a micro SD card, a memory stick).

In particular, according to the disclosure, the memory 120 may store an application for performing writing according to a touch interaction of a user, and an application for displaying a content. Also, the memory 120 may store a content received from an external device or generated by the electronic device 100, etc.

The processor 130 controls the overall operations of the electronic device 100. Specifically, the processor 130 may be connected with the components of the electronic device 100 including the display 110 and the memory 120 as described above, and may control the overall operations of the electronic device 100 by executing at least one instruction stored in the memory 120 as described above.

The processor 130 may be implemented in various ways. For example, the processor 130 may be implemented as at least one of an application specific integrated circuit (ASIC), an embedded processor, a microprocessor, hardware control logic, a hardware finite state machine (FSM), or a digital signal processor (DSP). Meanwhile, in the disclosure, the term processor 130 may include a central processing unit (CPU), a graphic processing unit (GPU), a main processing unit (MPU), etc.

In particular, according to the disclosure, the processor 130 may control the display 110 to display a first screen including a first layer for performing writing according to a touch interaction of a user. Specifically, the first layer refers to a layer for displaying writing corresponding to a touch interaction of a user on the trajectory of a touch interaction based on a signal according to a touch interaction of a user.

That is, in the disclosure, performing writing refers to displaying writing corresponding to a touch interaction of a user according to a touch interaction of a user, and the content of the writing may include various objects such as texts, characters, etc.

Meanwhile, if an event for displaying a content on the first screen occurs while the first screen is displayed, the processor 130 may control the display 110 to display a second screen including a second layer for displaying the content on the first layer and a third layer for performing writing according to a touch interaction of a user on the second layer on some areas of the first screen.

Specifically, the second layer may be a layer for displaying an application stored in the memory 120 or a content provided through software or a content received from an external device connected through the communicator 140. Other than the above, the second layer may be a layer for receiving a content displayed on the display 110 of an external device connected through the communicator 140 by a mirroring method and displaying the content.

Meanwhile, the third layer refers to a layer for displaying writing corresponding to a touch interaction of a user on the trajectory of a touch interaction based on a signal according to a touch interaction of a user, like the first layer.

Meanwhile, the third layer is located on the second layer, and may have the same size as the second layer. However, the size of the third layer according to the disclosure is not limited to a case wherein it is the same as the size of the second layer. That is, according to an embodiment of the disclosure, the third layer may have a smaller size than the second layer, and may be located in some areas on the second layer.

Meanwhile, in explaining the disclosure, explanation is made by suggesting a case wherein the second screen is displayed on some areas of the first screen as an example, but the disclosure is not limited thereto. That is, the disclosure can also be applied to a case wherein the first screen is displayed on some areas of the entire screen of the display 110, and the second screen is displayed on the remaining some areas of the entire screen of the display 110 wherein the first screen is not displayed.

Meanwhile, as described above, according to an embodiment of the disclosure, the first screen includes a first layer for performing writing according to a touch interaction of a user, and thus a user can perform writing on the first screen.

Also, according to an embodiment of the disclosure, the second screen includes not only a second layer displaying a content, but also a third layer for performing writing according to a touch interaction of a user, and the third layer is located on the second layer, and thus a user can also perform writing on the second screen.

Meanwhile, in case the first screen and the second screen as described above are displayed, a user may not only perform writing on the second screen, but also want to input a control command related to a content displayed on the second screen. Accordingly, the electronic device 100 according to an embodiment of the disclosure may operate in one of a first mode that may be referred to as a so-called 'writing mode,' or a second mode that may be referred to as a so-called 'manipulation mode.'

Specifically, based on a user instruction input while the second screen is displayed, the electronic device 100 may operate in one of the first mode for performing writing on the second screen according to a touch interaction input on the area wherein the second screen is displayed or the second mode for receiving a control command related to the content displayed on the second screen according to a touch interaction input on the area wherein the second screen is displayed. Also, the decision on which mode between the first mode and the second mode will be set as a default may vary according to a user setting.

Hereinafter, first, input of a user instruction in case the electronic device 100 operates in the first mode and the controlling process of the electronic device 100 according to the user instruction will be described in detail.

In case the electronic device 100 operates in the first mode, the processor 130 may control the display 110 to display writing on the second screen according to a touch interaction input on the area wherein the second screen is displayed.

Meanwhile, the electronic device 100 according to an embodiment of the disclosure includes a first layer and a third layer for performing writing according to a touch interaction of a user on the first screen and the second screen, respectively.

Accordingly, if a touch interaction that started in one area between the area wherein the first screen is displayed and the area wherein the second screen is displayed is performed through another area while the electronic device 100 operates in the first mode, writing corresponding to the trajectory of the touch interaction may be displayed seamlessly on the first screen and the second screen.

Specifically, if a touch interaction that started in one area between the area wherein the first screen is displayed and the area wherein the second screen is displayed is performed through another area while the electronic device 100 operates in the first mode, the processor 130 may control the display 110 to display writing corresponding to the touch interaction input on the area wherein the first screen is displayed on the first screen through the first layer and display writing corresponding to the touch interaction input on the area wherein the second screen is displayed on the second screen through the third layer.

Meanwhile, if a user instruction for moving the location wherein the second screen is displayed or changing the size in which the second screen is displayed is received, the locations or the sizes of the second layer and the third layer included in the second screen may be moved or changed according to the movement of the location of the second screen or the change of the size of the second screen.

Specifically, after writing corresponding to a touch interaction of a user is displayed on the second screen, if a user instruction for moving the location wherein the second screen is displayed to a different location is received, the processor 130 may move the location of the second layer and the location of the third layer according to the user instruction.

In particular, if a user instruction for moving the location wherein the second screen is displayed to a different location is received while the electronic device 100 operates in the first mode, the processor 130 may move the location of the second layer and the location of the third layer according to the user instruction, and accordingly, the location of a content displayed through the second layer and the location of writing displayed through the third layer may be moved according to the user instruction.

Also, after writing corresponding to a touch interaction of a user is displayed on the area wherein the second screen is displayed, if a user instruction for changing the size in which the second screen is displayed to a different size is received, the processor 130 may change the size of the second layer and the size of the third layer according to the user instruction.

In particular, if a user instruction for changing the size in which the second screen is displayed to a different size is received while the electronic device 100 operates in the first mode, the processor 130 may change the size of the second layer and the size of the third layer according to the user instruction, and accordingly, the size of a content displayed through the second layer and the size of writing displayed through the third layer may be changed according to the user instruction.

Hereinafter, input of a user instruction in case the electronic device 100 operates in the second mode and the controlling process of the electronic device 100 according to the input user instruction will be described in detail.

In case the electronic device 100 operates in the second mode, the electronic device 100 may receive a control command related to a content displayed on the second screen according to a touch interaction input on the area wherein the second screen is displayed.

In other words, if a touch interaction of a user is input on the area wherein the second screen is displayed while the electronic device 100 operates in the second mode, the electronic device 100 may not perform writing according to the input touch interaction, but perform control related to the content displayed on the second screen according to the input touch interaction.

Also, if a user instruction for making the electronic device 100 operate in the second mode is received while the electronic device 100 operates in the first mode, the processor 130 may control the display 110 to provide the writing displayed on the second screen while changing its transparency according to a touch interaction input on the area wherein the second screen is displayed while the electronic device 100 operates in the first mode.

In particular, if a user instruction for making the electronic device 100 operate in the second mode is received while the electronic device 100 operates in the first mode, the processor 130 may control the display 110 to provide the writing displayed on the second screen while lowering its transparency according to a touch interaction input on the area wherein the second screen is displayed while the electronic device 100 operates in the first mode.

Here, provision of writing while lowering its transparency includes lowering the transparency of the writing to 0 and thereby preventing the writing from being displayed on the second screen. Also, the decision on how much the transparency of writing to be provided will be changed can be applied differently according to a user setting.

Meanwhile, in case the electronic device 100 operates in the second mode, like in the case wherein the electronic device 100 operates in the first mode, if a user instruction for moving the location wherein the second screen is displayed or changing the size in which the second screen is displayed is received, the locations or the sizes of the second layer and the third layer included in the second screen may be moved or changed according to the movement of the location of the second screen or the change of the size of the second screen.

Meanwhile, so far, a case wherein the electronic device 100 operates in the first mode and then operates in the second mode was described. However, a case wherein the electronic device 100 operates in the second mode and then operates in the first mode on the contrary is also possible, and in this case, the aforementioned controlling process in the first mode may be applied as it is.

In particular, in case the operation mode of the electronic device 100 changes from the first mode to the second mode, and then to the first mode again, the writing provided while its transparency is changed as its mode is changed from the first mode to the second mode is changed from the second mode to the first mode again, and accordingly, the writing may be provided while its transparency is changed to the transparency as displayed on the second screen before being changed to the second mode.

Meanwhile, so far, an embodiment wherein writing is performed on the first screen and the second screen according to a touch interaction of a user was described in detail. However, the disclosure may also be applied in the same manner to a case wherein writing displayed on the first screen and the second screen is deleted according to a touch interaction of a user.

For example, if a touch interaction that started in one area between the area wherein the first screen is displayed and the area wherein the second screen is displayed is performed through another area while the electronic device 100 operates in the first mode, the processor 130 may delete writing corresponding to the touch interaction input on the area wherein the first screen is displayed on the first screen, and delete writing corresponding to the touch interaction input on the area wherein the second screen is displayed on the second screen.

According to the aforementioned embodiment of the disclosure, a user of the electronic device 100 may perform writing seamlessly on the entire screen of the display 110 screen including an area for providing contents and the external area thereof.

In addition, even in case wherein a user changes the location or the size of an area for providing contents, the location or the size of writing displayed on the area for providing contents may also be adaptively changed.

Also, a user may freely input a control command related to a content through change of the operation mode of the electronic device 100, and in the case of performing writing through change of the operation mode again after inputting a control command, continuity with the previous writing can be maintained.

Further, in case a user wants to input a control command related to a content after writing is performed on an area for providing contents, the transparency of the writing displayed on the area for providing contents is changed, and thus the user can input a control command related to a content without interference of the writing.

In conclusion, according to the various embodiments of the disclosure, a user may be provided with an analog experience as if writing is performed on actual paper, and in accordance thereto, productivity of the user may be improved noticeably.

Figure 2:
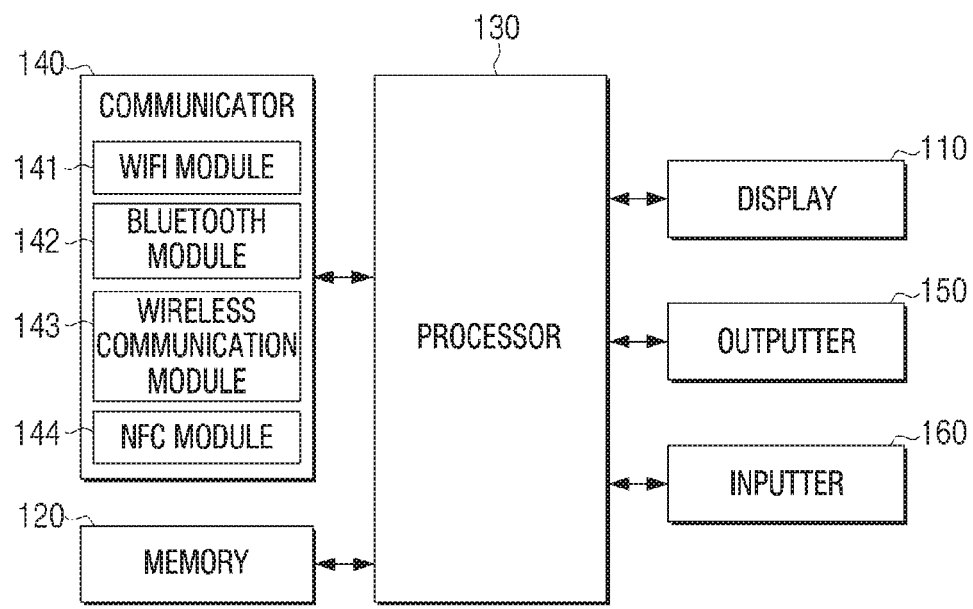
FIG. 2 is a block diagram illustrating in detail a configuration of an electronic device according to an embodiment of the disclosure.

FIG. 2 is a block diagram illustrating in detail a configuration of an electronic device according to an embodiment of the disclosure.

As illustrated in FIG. 2, the electronic device 100 according to an embodiment of the disclosure not only includes a display 110, a memory 120, and a processor 130, but it may also further include a communicator 140, an outputter 150, and an inputter 160. However, components as above are exemplary ones, and in implementing the disclosure, new components can be added in addition to the components as above or some components can be omitted.

The communicator 140 includes circuitry, and may perform communication with an external device (not shown) or a server (not shown). Also, the communicator 140 may include at least one of a WiFi module 141, a Bluetooth module 142, a wireless communication module 143, or an NFC module 144.

Specifically, the WiFi module 144 and the Bluetooth module 142 may perform communication by a WiFi method and a Bluetooth method, respectively. In the case of using the WiFi module 141 or the Bluetooth module 142, various types of connection information such as SSID, etc. may be transmitted and received first, and connection of communication may be performed by using the information, and then various types of information may be transmitted and received.

Also, the wireless communication module 143 may perform communication according to various communication standards such as IEEE, Zigbee, 3rd generation (3G), 3rd generation partnership project (3GPP), long term evolution (LTE), and 5th generation (5G). Meanwhile, the NFC module 144 may perform communication by a near field communication (NFC) method using a 13.56 MHz band among various RF-ID frequency bands such as 135 kHz, 13.56 MHz, 433 MHz, 860-960 MHz, and 2.45 GHz.

In particular, in various embodiments related to the disclosure, the communicator 140 may be connected with an external device and receive a content from the external device. Also, the communicator 140 may be connected with an external device and receive a content displayed on the display 110 of the external device from the external device by a mirroring method.

Meanwhile, in case a content displayed on the display 110 of the external device is received by a mirroring method and is displayed on the display 110 of the electronic device 100 and the electronic device 100 operates in the second mode, if a control command related to the content displayed on the second screen is received according to a touch interaction input on the area wherein the second screen is displayed, the processor 130 may transmit a signal related to the received control command to the external device through the communicator 140.

The outputter 150 includes circuitry, and may output various functions that the electronic device 100 can perform. Also, the outputter 150 may include at least one of the display 110, a speaker, or an indicator.

Here, the speaker may output audio data by control of the processor 130, and the indicator may be lighted by control of the processor 130. Meanwhile, as the display 110 was regarded as a separate component and was described above, overlapping explanation regarding the display 110 will be omitted.

In particular, in an embodiment of the disclosure, in case the operation mode of the electronic device 100 changes from the first mode to the second mode, or from the second mode to the first mode, the outputter 150 may provide notification informing a user that the operation mode of the electronic device 100 has been changed through output of a voice through the speaker or lighting through the indicator.

The inputter 160 includes circuitry, and may receive a user instruction for controlling the operation of the electronic device 100. Specifically, the inputter 160 may consist of components such as a camera (not shown), a microphone (not shown), and a remote control signal receiver (not shown). Also, the inputter 160 is a touch screen, and may be implemented in the form of being included in the display 110.

In particular, in an embodiment of the disclosure, the inputter 160 may receive various user instructions such as a user instruction for changing the operation mode of the electronic device 100 from the first mode to the second mode, or from the second mode to the first mode, a touch interaction input on the area wherein the first screen is displayed and the area wherein the second screen is displayed, a user instruction for moving the location wherein the second screen is displayed to a different location, and a user instruction for changing the size in which the second screen is displayed to a different size.

Specifically, the aforementioned various user instructions may not only be input as touch interactions on a touch screen, but they may also be input in the form of user voices through a microphone, or input through various types of input devices such as a remote controller, a mouse, and a keyboard.

Figure 3A:
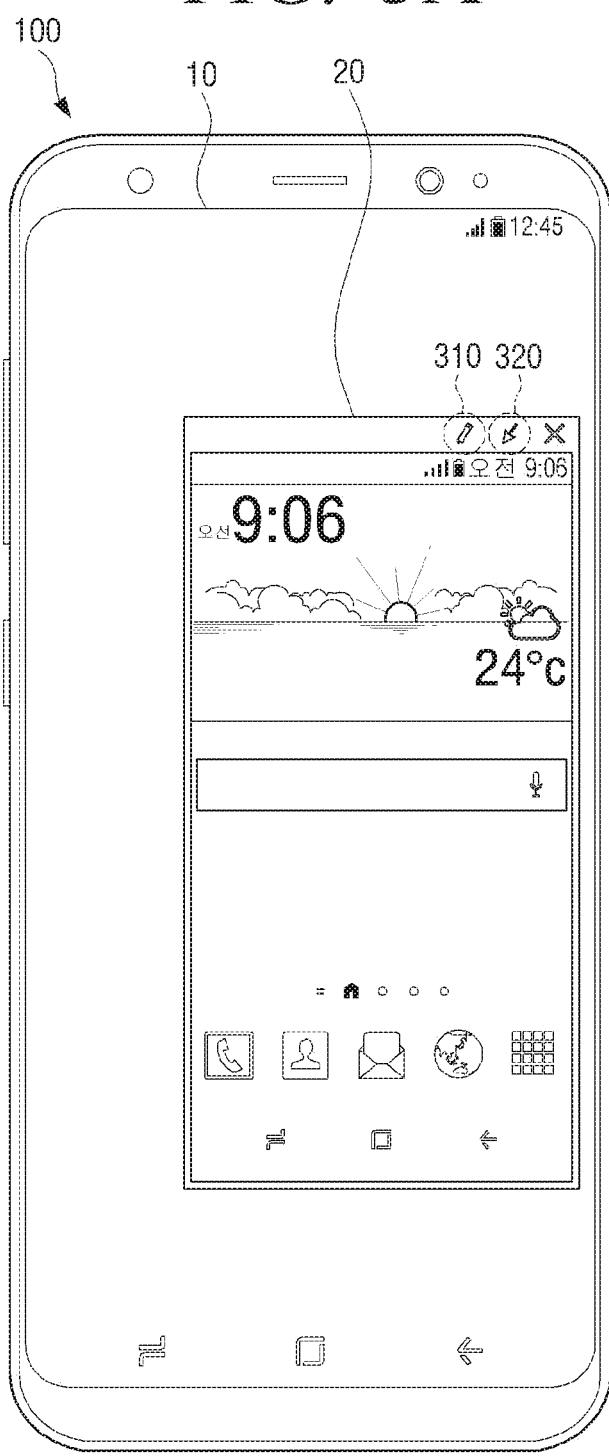
FIG. 3A is a diagram for illustrating a first screen and a second screen according to an embodiment of the disclosure.
Figure 3B:
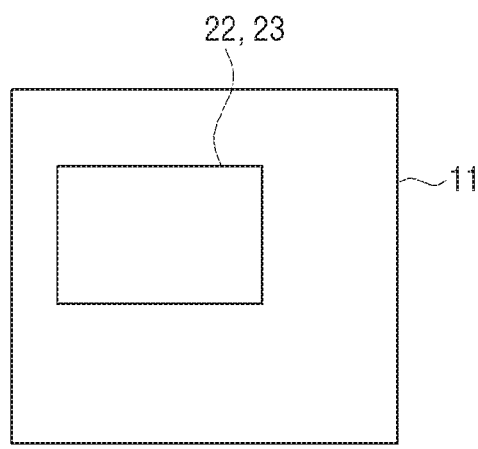
FIG. 3B is a diagram for illustrating a second layer and a third layer included in a first layer and a second layer included in the first screen.
Figure 3C:
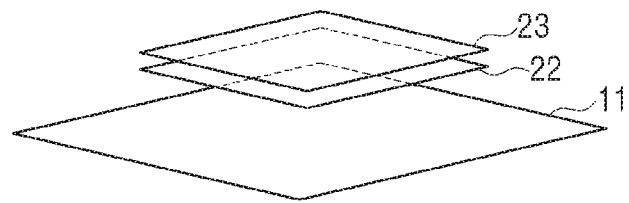
FIG. 3C is a diagram for illustrating a second layer and a third layer included in a first layer and a second layer included in the first screen.

FIG. 3A is a diagram for illustrating a first screen and a second screen according to an embodiment of the disclosure, and FIG. 3B and FIG. 3C are diagrams for illustrating a second layer and a third layer included in a first layer and a second layer included in the first screen.

As illustrated in FIG. 3A, the electronic device 100 according to an embodiment of the disclosure may display a first screen 10 and a second screen 20. Specifically, the electronic device 100 may display the first screen 10, and if an event for displaying a content on the first screen 10 occurs while the first screen 10 is displayed, the electronic device 100 may display the second screen 20 on some areas of the first screen 10.

Also, the first screen 10 may include a first layer 11 for performing writing according to a touch interaction of a user, and the second screen 20 may include a second layer 22 for displaying contents and a third layer 23 for performing writing according to a touch interaction of a user.

Meanwhile, based on a user instruction input while the second screen 20 is displayed, the electronic device 100 may operate in one of a first mode for performing writing on the second screen 20 according to a touch interaction input on the area wherein the second screen 20 is displayed or a second mode for receiving a control command related to the content displayed on the second screen 20 according to a touch interaction input on the area wherein the second screen 20 is displayed.

Also, a user instruction for changing the operation mode of the electronic device 100 between the first mode and the second mode may be input by a method of touching an icon displayed on the second screen 20.

For example, as illustrated in FIG. 3A, a user instruction for changing the operation mode of the electronic device 100 between the first mode and the second mode may be input by a method of selecting an icon displayed on the second screen 20. Specifically, a user instruction for changing the operation mode of the electronic device 100 between the first mode and the second mode may be input according to a touch interaction of a user for selecting one of an icon 310 for changing to the first mode or an icon 320 for changing to the second mode.

Also, if a touch interaction of a user for selecting one of the icon 310 for changing to the first mode or the icon 320 for changing to the second mode is input, the electronic device 100 may display the selected icon while changing the color of the icon, and accordingly, the electronic device 100 may provide a visual effect of informing a user of the current operation mode.

Meanwhile, so far, a case wherein a user instruction for changing the operation mode of the electronic device 100 between the first mode and the second mode is input by a method of selecting an icon displayed on the second screen 20 was described. However, a user instruction for changing the operation mode of the electronic device 100 between the first mode and the second mode can be input by various methods such as a voice of a user.

Meanwhile, referring to FIG. 3B, the second layer 22 may be located on the first layer 11 included in the first screen 10, and the third layer 23 included in the second screen 20 may be located on the second layer 22 included in the second screen 20. Also, the third layer 23 may have the same size as the second layer 22.

Specifically, according to an embodiment of the disclosure, the second screen 20 is displayed on some areas of the first screen 10. Thus, in this case, the second layer 22 and the third layer 23 included in the second screen 20 may be located on some areas of the first layer 11 included in the first screen 10.

Meanwhile, according to an embodiment of the disclosure, the first screen 10 includes the first layer 11 for performing writing according to a touch interaction of a user, and thus a user can perform writing on the first screen 10.

Also, according to an embodiment of the disclosure, the second screen 20 includes not only the second layer 22 displaying contents, but also the third layer 23 for performing writing according to a touch interaction of a user, and the third layer 23 is located on the second layer 22, and thus a user can perform writing on the second screen 20.

Meanwhile, if a user instruction for moving the location wherein the second screen 20 is located or for changing the size in which the second screen 20 is displayed is received, the locations or the sizes of the second layer 22 and the third layer 23 included in the second screen 20 may be moved or changed according to the movement of the location of the second screen 20 or the change of the size of the second screen 20.

Hereinafter, various embodiments according to the disclosure will be described in detail based on the assumption of the components of the first screen 10, the second screen 20, the first layer 11, the second layer 22, and the third layer 23 as described above.

FIGS. 4A to 4D are diagrams for illustrating embodiments wherein writing is displayed on the first screen and the second screen according to a touch interaction input on the area wherein the first screen is displayed and the area wherein the second screen is displayed.

As described above, in case the electronic device 100 according to the disclosure operates in the first mode, the electronic device 100 may display writing on the first screen 10 and the second screen 20 according to a touch interaction input on the area wherein the first screen 10 is displayed and the area wherein the second screen 20 is displayed.

Specifically, if a touch interaction that started in one area between the area wherein the first screen 10 is displayed and the area wherein the second screen 20 is displayed is performed through another area while the electronic device 100 operates in the first mode, the electronic device 100 may display writing corresponding to the touch interaction input on the area wherein the first screen 10 is displayed on the first screen 10 through the first layer 11 and display writing corresponding to the touch interaction input on the area wherein the second screen 20 is displayed on the second screen 20 through the third layer 23.

Figure 4A:
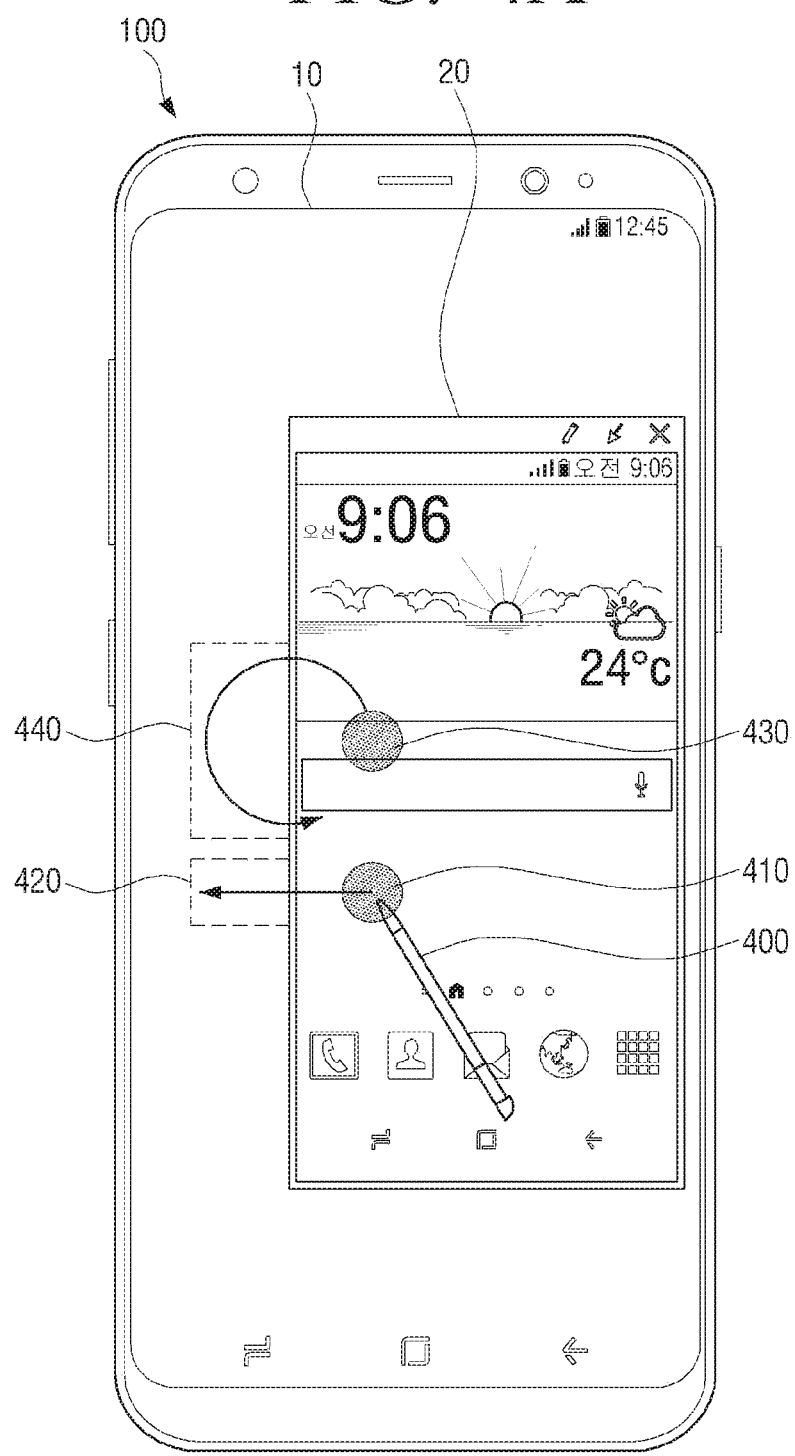
FIG. 4A is a diagram for illustrating an embodiment wherein writing is displayed on the first screen and the second screen according to a touch interaction input on the area wherein the first screen is displayed and the area wherein the second screen is displayed.

For example, as illustrated in FIG. 4A, a touch interaction of a user using a writing stylus 400, for example, may start from the area wherein the second screen 20 is displayed. Specifically, a touch interaction of a user may start from one point 410 included in the area wherein the second screen 20 is displayed.

Also, as illustrated in FIG. 4A, a touch interaction that started from the area wherein the second screen 20 is displayed may be performed through the area wherein the first screen 10 is displayed. Specifically, a touch interaction that started from the area wherein the second screen 20 is displayed may be performed through at least one point 420 included in the area wherein the first screen 10 is displayed.

Figure 4B:
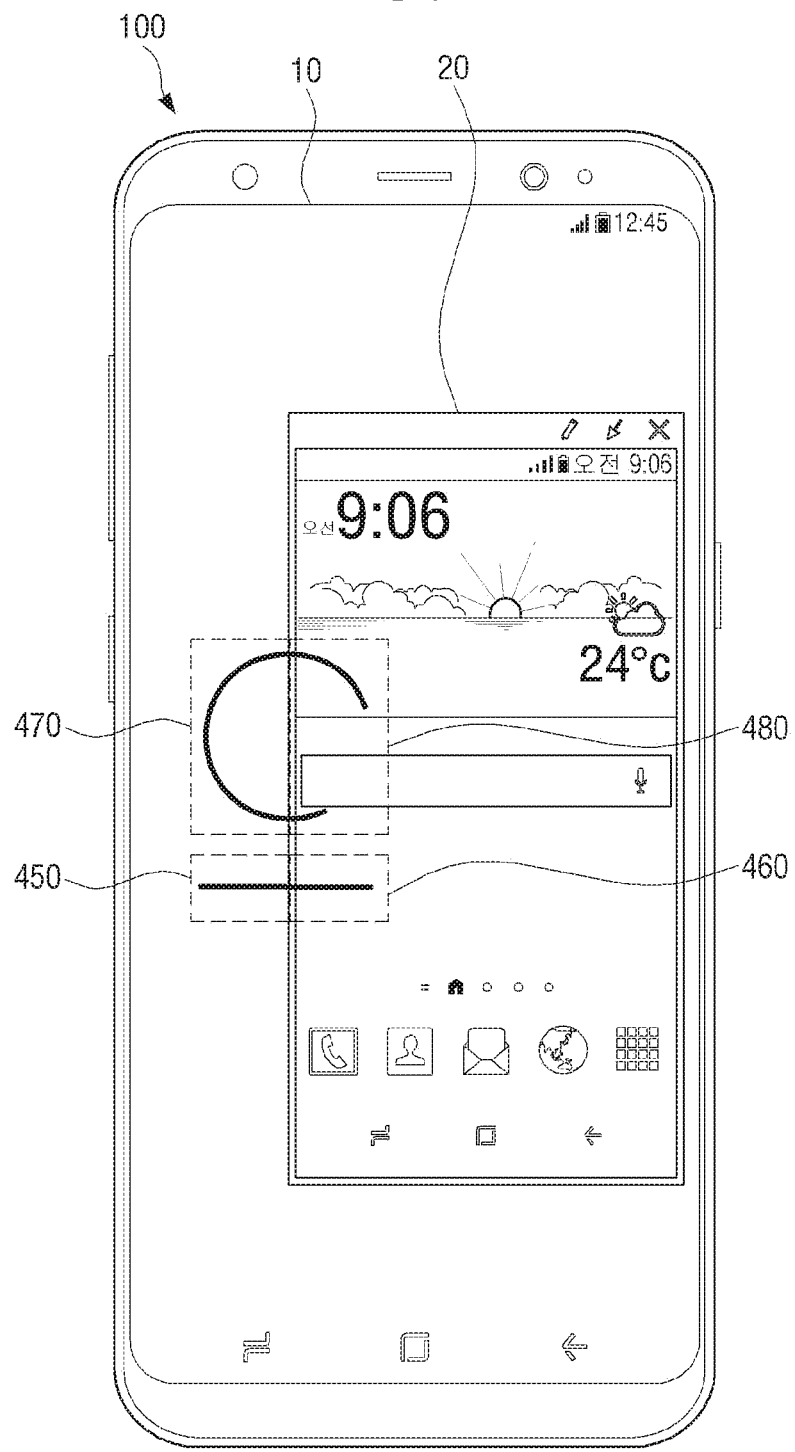
FIG. 4B is a diagram for illustrating an embodiment wherein writing is displayed on the first screen and the second screen according to a touch interaction input on the area wherein the first screen is displayed and the area wherein the second screen is displayed.

In this case, as illustrated in FIG. 4B, the electronic device 100 may display writing 450 corresponding to a touch interaction input on the area wherein the first screen 10 is displayed on the first screen 10 through the first layer 11, and display writing 460 corresponding to a touch interaction input on the area wherein the second screen 20 is displayed on the second screen 20 through the third layer 23.

Meanwhile, so far, a case wherein a touch interaction that started from the area wherein the second screen 20 is displayed is performed through the area wherein the first screen 10 is displayed was described. However, the disclosure can be applied to a case wherein a touch interaction that started from the area wherein the first screen 10 is displayed is performed through the area wherein the second screen 20 is displayed.

In addition, so far, it was illustrated that a touch interaction that started from the area wherein the second screen 20 is displayed is performed through the area wherein the first screen 10 is displayed and is finished in the area wherein the first screen 10 is displayed, but the disclosure is not limited thereto.

That is, like the touch interaction illustrated in FIG. 4A, a touch interaction that started from one point 430 included in the area wherein the second screen 20 is displayed may be performed through at least one point 440 included in the area wherein the first screen 10 is displayed and may be finished in the area wherein the second screen 20 is displayed.

In this case, as illustrated in FIG. 4B, the electronic device 100 may display writing 470 corresponding to a touch interaction input on the area wherein the first screen 10 is displayed on the first screen 10 through the first layer 11, and display writing 480 corresponding to a touch interaction input on the area wherein the second screen 20 is displayed on the second screen 20 through the third layer 23.

Figure 4C:
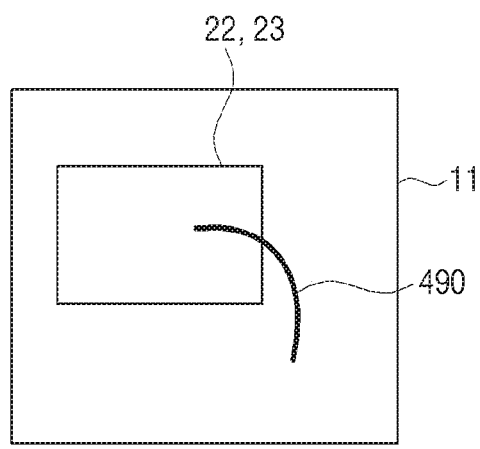
FIG. 4C is a diagram for illustrating an embodiment wherein writing is displayed on the first screen and the second screen according to a touch interaction input on the area wherein the first screen is displayed and the area wherein the second screen is displayed.
Figure 4D:
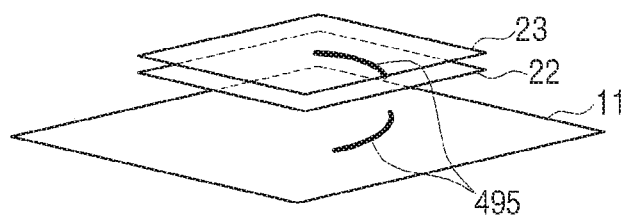
FIG. 4D is a diagram for illustrating an embodiment wherein writing is displayed on the first screen and the second screen according to a touch interaction input on the area wherein the first screen is displayed and the area wherein the second screen is displayed.

Meanwhile, FIGS. 4C and 4D are diagrams for illustrating a process of displaying writing according to a touch interaction as described above based on the components of the first layer 11 to the third layer 23. As the components of the first layer to the third layer 23 were explained with reference to FIGS. 3B and 3C, overlapping explanation will be omitted below.

As illustrated in FIGS. 4C and 4D, if a touch interaction of a user is performed through the area wherein the first layer 11 is located and the area wherein the third layer 23 is located, writing 490, 495 corresponding to the touch interaction may be displayed on the first screen 10 and the second screen 20 through the first layer 11 and the third layer 23.

Specifically, if a touch interaction that started from one area between the area wherein the first layer 11 is located and the area wherein the third layer 23 is located is performed through another area, the electronic device 100 may display writing corresponding to a touch interaction input on the area wherein the first layer 11 is located on the first screen 10 through the first layer 11, and display writing corresponding to a touch interaction input on the area wherein the third layer 23 is located on the second screen 20 through the third layer 23.

As examined above, the electronic device 100 according to an embodiment of the disclosure includes the first layer 11 and the third layer 23 for performing writing according to a touch interaction of a user on the first screen 10 and the second screen 20, respectively.

Accordingly, if a touch interaction that started in one area between the area wherein the first screen 10 is displayed and the area wherein the second screen 20 is displayed is performed through another area while the electronic device 100 operates in the first mode, writing corresponding to the trajectory of the touch interaction may be displayed seamlessly on the first screen 10 and the second screen 20.

In other words, according to the aforementioned embodiment of the disclosure, a user of the electronic device 100 may perform writing seamlessly on the entire screen of the display screen including an area for providing contents and the external area thereof.

FIGS. 5A to 6B are diagrams for illustrating embodiments wherein, in case a user instruction for moving the location wherein the second screen is displayed to a different location or for changing the size in which the second screen is displayed to a different size is received, the locations of the second layer and the third layer are moved or the sizes of the second layer and the third layer are changed.

In explaining FIGS. 5A to 6B, explanation will be made based on the assumption of a case wherein, while writing corresponding to a touch interaction is displayed on the first screen 10 and the second screen 20 according to a touch interaction input on the area wherein the first screen 10 is displayed and the area wherein the second screen 20 is displayed while the electronic device 100 operates in the first mode, a user instruction for moving the location of the second screen 20 or for changing the size of the second screen 20 is received, as explained in FIGS. 4A to 4D.

As described above, after writing corresponding to a touch interaction of a user is displayed on the second screen 20, if a user instruction for moving the location wherein the second screen 20 is displayed to a different location is received, the electronic device 100 may move the location of the second layer 22 and the location of the third layer 23 according to the user instruction.

In particular, if a user instruction for moving the location wherein the second screen 20 is displayed to a different location is received while the electronic device 100 operates in the first mode, the electronic device 100 may move the location of the second layer 22 and the location of the third layer 23 according to the user instruction. Accordingly, the location of a content displayed through the second layer 22 and the location of writing displayed through the third layer 23 may be moved according to the user instruction.

Figure 5A:
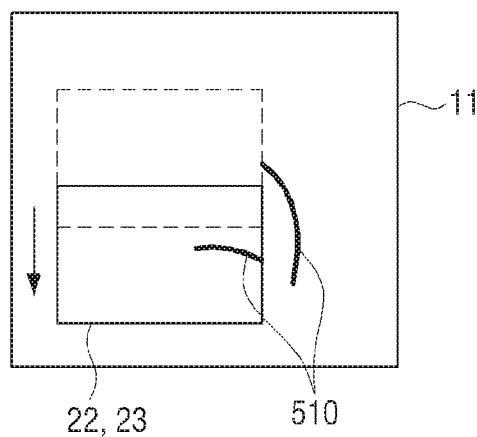
FIG. 5A is a diagram for illustrating an embodiment wherein, in case a user instruction for moving the location wherein the second screen is displayed to a different location or for changing the size in which the second screen is displayed to a different size is received, the locations of the second layer and the third layer are moved or the sizes of the second layer and the third layer are changed.
Figure 5B:
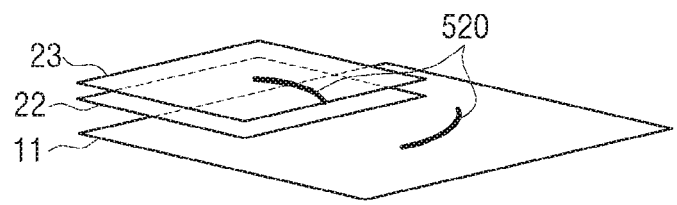
FIG. 5B is a diagram for illustrating an embodiment wherein, in case a user instruction for moving the location wherein the second screen is displayed to a different location or for changing the size in which the second screen is displayed to a different size is received, the locations of the second layer and the third layer are moved or the sizes of the second layer and the third layer are changed.

For example, as illustrated in FIGS. 5A and 5B, after writing 510, 520 corresponding to a touch interaction of a user is displayed on the second screen 20, if a user instruction for moving the location wherein the second screen 20 is displayed to a different location is received, the electronic device 100 may move the location of the second layer 22 and the location of the third layer 23 according to the user instruction. Also, in accordance thereto, the location of a content displayed through the second layer 22 and the location of the writing 510, 520 displayed through the third layer 23 may be moved according to the user instruction.

Meanwhile, as described above, after writing corresponding to a touch interaction of a user is displayed on the area wherein the second screen 20 is displayed, if a user instruction for changing the size in which the second screen 20 is displayed to a different size is received, the electronic device 100 may change the size of the second layer 22 and the size of the third layer 23 according to the user instruction.

In particular, if a user instruction for changing the size in which the second screen 20 is displayed to a different size is received while the electronic device 100 operates in the first mode, the electronic device 100 may change the size of the second layer 22 and the size of the third layer 23 according to the user instruction, and accordingly, the size of a content displayed through the second layer 22 and the size of writing displayed through the third layer 23 may be changed according to the user instruction.

Figure 6A:
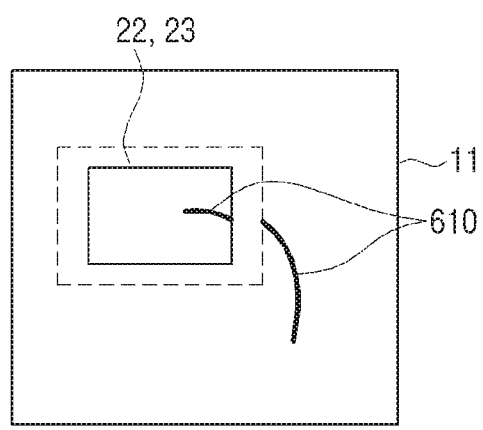
FIG. 6A is a diagram for illustrating an embodiment wherein, in case a user instruction for moving the location wherein the second screen is displayed to a different location or for changing the size in which the second screen is displayed to a different size is received, the locations of the second layer and the third layer are moved or the sizes of the second layer and the third layer are changed.
Figure 6B:
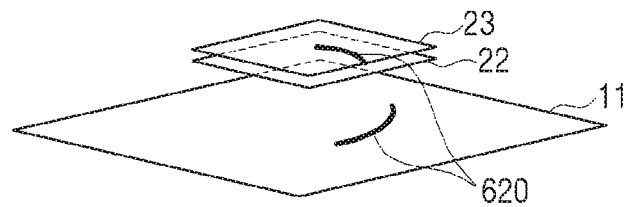
FIG. 6B is a diagram for illustrating an embodiment wherein, in case a user instruction for moving the location wherein the second screen is displayed to a different location or for changing the size in which the second screen is displayed to a different size is received, the locations of the second layer and the third layer are moved or the sizes of the second layer and the third layer are changed.

For example, as illustrated in FIGS. 6A and 6B, after writing 610, 620 corresponding to a touch interaction of a user is displayed on the second screen 20, if a user instruction for changing the size in which the second screen 20 is displayed to a different size is received, the electronic device 100 may change the size of the second layer 22 and the size of the third layer 23 according to the user instruction. Also, in accordance thereto, the size of a content displayed through the second layer 22 and the size of the writing 610, 620 displayed through the third layer 23 may be changed according to the user instruction.

As described above, according to the various embodiments of the disclosure, after writing corresponding to a touch interaction of a user is displayed on the second screen 20, in case the location or the size in which the second screen 20 is displayed is changed, the location or the size of writing displayed on the second screen 20 may also be adaptively changed.

Also, the above feature is based on the features that the third layer 23 for performing writing exists separately from the first layer 11, and that the third layer 23 is included in the second screen 20 together with the second layer 22 for displaying contents, and that the third layer 23 may have the same size as the second layer 22.

Figure 7:
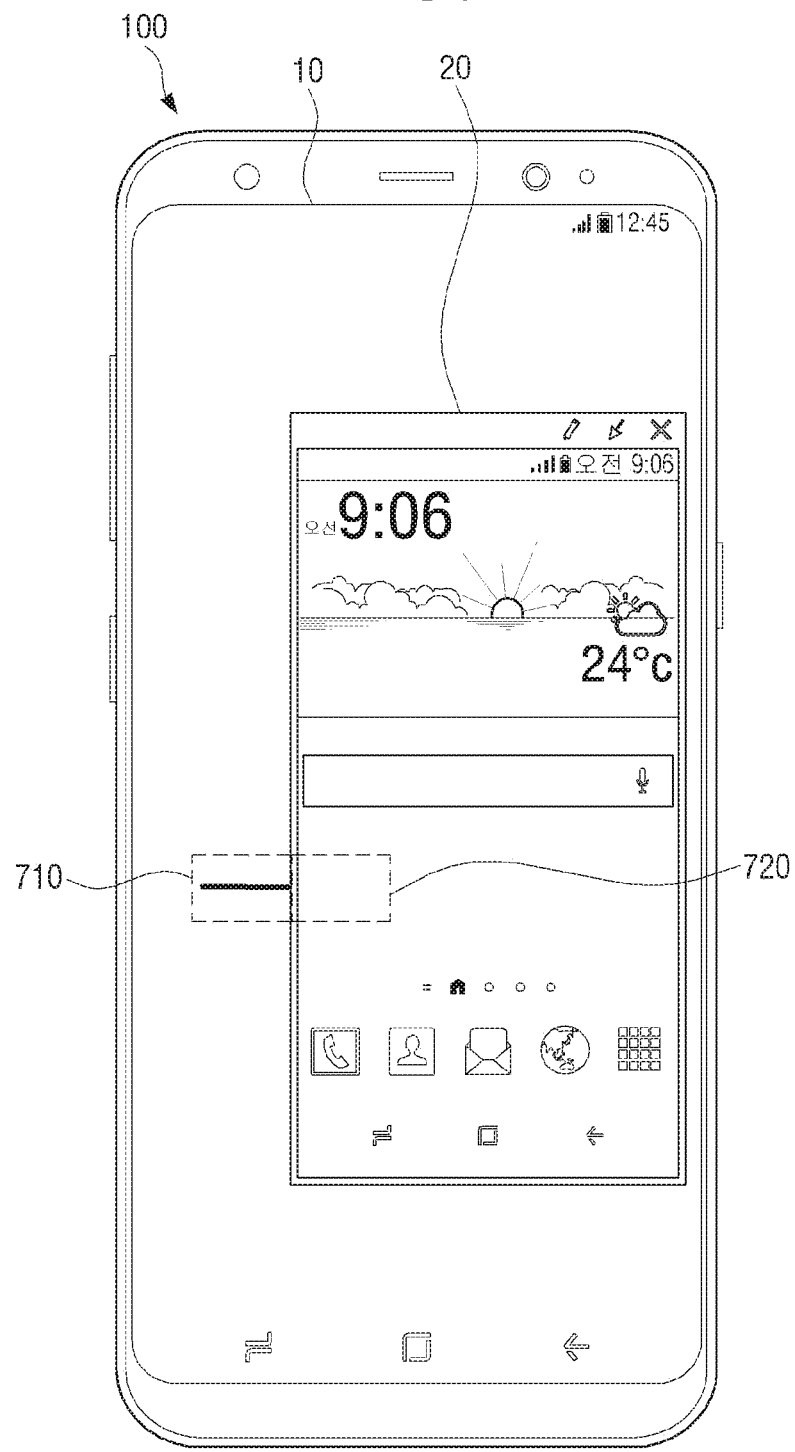
FIG. 7 is a diagram for illustrating an embodiment wherein, in case the operation mode of an electronic device changes from a first mode to a second mode, writing displayed on the second screen is provided while its transparency is changed while the electronic device operates in the first mode.

FIG. 7 is a diagram for illustrating an embodiment wherein, in case the operation mode of an electronic device changes from a first mode to a second mode, writing displayed on a second screen is provided while its transparency is changed while the electronic device operates in the first mode.

In case the electronic device 100 according to the disclosure operates in the second mode, the electronic device 100 may receive a control command related to a content displayed on the second screen 20 according to a touch interaction input on the area wherein the second screen 20 is displayed.

In other words, if a touch interaction of a user is input on the area wherein the second screen 20 is displayed while the electronic device 100 operates in the second mode, the electronic device 100 may not perform writing according to the input touch interaction, but perform control related to the content displayed on the second screen 20 according to the input touch interaction.

Also, if a user instruction for making the electronic device 100 operate in the second mode is received while the electronic device 100 operates in the first mode, the electronic device 100 may provide the writing displayed on the second screen 20 while changing its transparency according to a touch interaction input on the area wherein the second screen 20 is displayed while the electronic device 100 operates in the first mode.

In particular, if a user instruction for making the electronic device 100 operate in the second mode is received while the electronic device 100 operates in the first mode, the electronic device 100 may provide the writing displayed on the second screen 20 while lowering its transparency according to a touch interaction input on the area wherein the second screen 20 is displayed while the electronic device 100 operates in the first mode.

Here, provision of writing while lowering its transparency includes lowering the transparency of the writing to 0 and thereby preventing the writing from being displayed on the second screen 20. Also, the decision on how much the transparency of writing to be provided will be changed can be applied differently according to a user setting.

For example, as illustrated in FIG. 4A, if a touch interaction that started from the area wherein the second screen 20 is displayed is performed through at least one point 420 included in the area wherein the first screen 10 is displayed while the electronic device 100 operates in the first mode, the electronic device 100 may display writing 450 corresponding to a touch interaction input on the area wherein the first screen 10 is displayed on the first screen 10 through the first layer 11, and display writing 460 corresponding to a touch interaction input on the area wherein the second screen 20 is displayed on the second screen 20 through the third layer 23, as illustrated in FIG. 4B.

Afterwards, if a user instruction for making the electronic device 100 operate in the second mode is received, the electronic device 100 may display the writing displayed on the second screen 20 while lowering its transparency to 0 according to a touch interaction input on the area wherein the second screen 20 is displayed while the electronic device 100 operates in the first mode, as illustrated in FIG. 7.

Accordingly, as illustrated in FIG. 7, only the writing 710 corresponding to a touch interaction input on the area wherein the first screen 10 is displayed among the writing as illustrated in FIG. 4B is displayed on the first screen 10, and the writing 720 corresponding to a touch interaction input on the area wherein the second screen 20 is displayed is not displayed.

Meanwhile, in case the electronic device 100 operates in the second mode, as in a case wherein the electronic device 100 operates in the first mode, if a user instruction for moving the location of the second screen 20 or for changing the size of the second screen 20 is received, the locations or the sizes of the second layer 22 and the third layer 23 included in the second screen 20 may be adaptively moved or changed according to the movement of the location of the second screen 20 or the change of the size of the second screen 20. As explanation in this regard was made above in the explanation regarding FIGS. 5A to 6B, overlapping explanation will be omitted.

According to an embodiment of the disclosure as described above, in case a user wants to input a control command related to a content according to a touch interaction after writing is performed on the second screen 20, the electronic device 100 provides the writing displayed on the second screen 20 while changing its transparency, and can thereby improve the user's convenience in manipulating the content.

Figure 8:
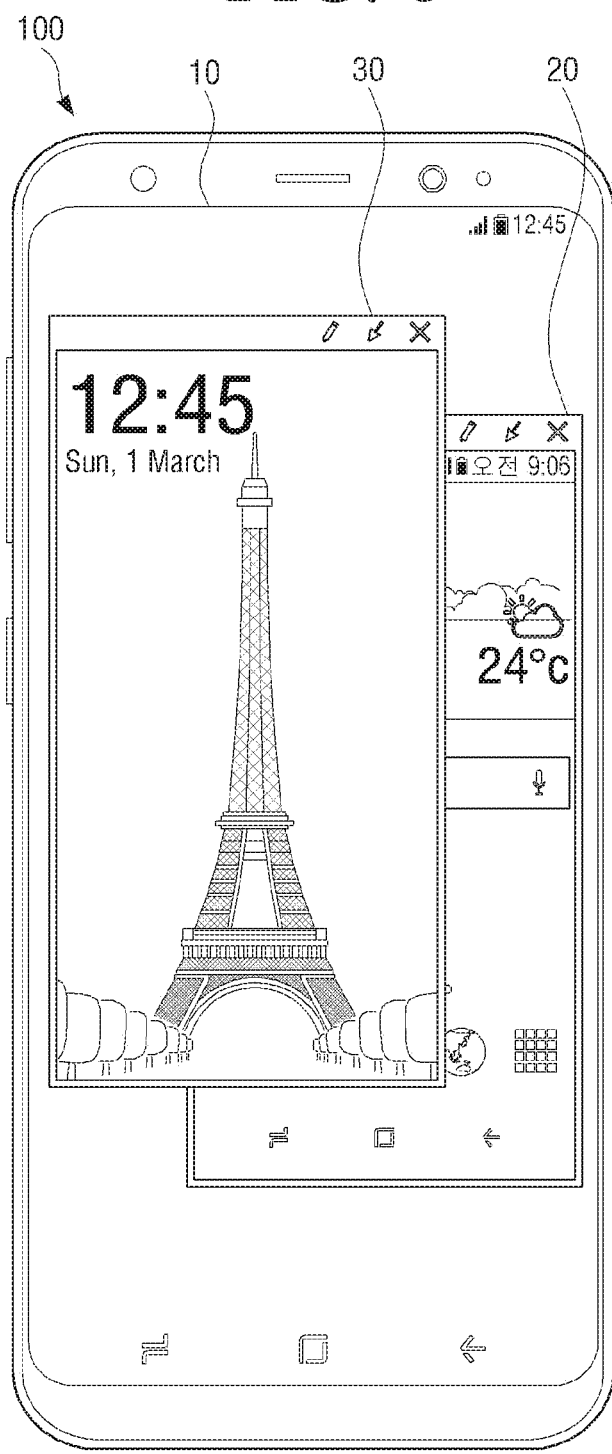
FIG. 8 is a diagram for illustrating an embodiment wherein an electronic device according to the disclosure displays a first screen, a second screen, and a third screen.

FIG. 8 is a diagram for illustrating an embodiment wherein an electronic device according to the disclosure displays a first screen, a second screen, and a third screen.

As described above, if an event for displaying a content on the first screen 10 occurs while the first screen 10 is displayed, the electronic device 100 may display the second screen 20 including a second layer for displaying the content on the first layer and a third layer for performing writing according to a touch interaction of a user on the second layer.

However, the disclosure is not limited to a case of displaying the first screen 10 and the second screen 20. That is, according to an embodiment of the disclosure, the electronic device 100 may additionally display at least one screen on the first screen 10 and the second screen 20. For example, as illustrated in FIG. 8, the electronic device 100 according to an embodiment of the disclosure may additionally display a third screen 30 on the first screen 10 and the second screen 20.

Specifically, if an event for displaying a content on the first screen 10 and the second screen 20 occurs while the first screen 10 and the second screen 20 are displayed, the electronic device 100 may additionally display a third screen 30 including a fourth layer for displaying a content on the first to third layers, and a fifth layer for performing writing according to a touch interaction of a user on the fourth layer.

In this case, as illustrated in FIG. 8, the third screen 30 may be displayed on some areas of the areas wherein the first screen 10 and the second screen 20 are displayed. However, the disclosure is not limited thereto, and the third screen 30 may be displayed only on some areas of the area wherein the first screen 10 is displayed, or displayed only on some areas of the area wherein the second screen 20 is displayed. In addition, the third screen 30 may be displayed in the form of a dual screen together with the second screen 20.

In case the third screen 30 is displayed on the first screen 10 and the second screen 20 in various forms as described above, the first screen 10, the second screen 20, and the third screen 30 respectively include a first layer, a third layer, and a fifth layer for performing writing according to a touch interaction of a user. Thus, if a touch interaction that started in one area among the area wherein the first screen 10 is displayed, the area wherein the second screen 20 is displayed, and the area wherein the third screen 30 is displayed is performed through at least one other area while the electronic device 100 operates in the first mode, writing corresponding to the touch interaction of the user may be displayed seamlessly on at least two screens among the first screen 10, the second screen 20, and the third screen 30.

Further, if a user instruction for moving the location of the third screen 30 or for changing the size of the third screen 30 is input, the locations or the sizes of the fourth layer and the fifth layer included in the third screen 30 may be moved or changed according to the movement of the location of the third screen 30 or the change of the size of the third screen 30. Other than the above, various embodiments related to a case wherein only the first screen 10 and the second screen 20 are displayed can be applied in the same way to a case wherein the third screen 30 is displayed together with the first screen 10 and the second screen 20.

Figure 9:
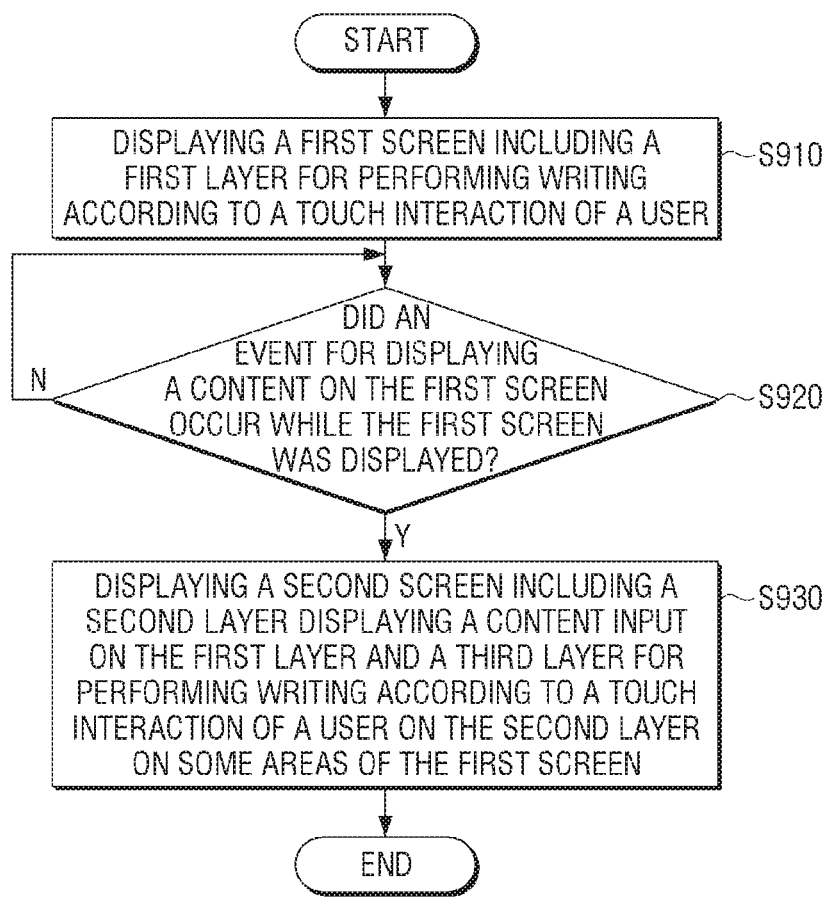
FIG. 9 is a flow chart for illustrating a controlling method of an electronic device according to an embodiment of the disclosure.

FIG. 9 is a flow chart for illustrating a controlling method of an electronic device according to an embodiment of the disclosure.

According to an embodiment of the disclosure, the electronic device 100 may display a first screen including a first layer for performing writing according to a touch interaction of a user at operation S910. Also, if it is before an event for displaying a content on the first screen occurs while the first screen is displayed at operation S920-N, the electronic device 100 may maintain the state of displaying the first screen.

If an event for displaying a content on the first screen occurs while the first screen is displayed at operation S920-Y, the electronic device 100 may display a second screen including a second layer for displaying the content on the first layer and a third layer for performing writing according to a touch interaction of a user on the second layer on some areas of the first screen at operation S930.

Here, the first layer and the third layer refer to layers for displaying writing corresponding to a touch interaction of a user on the trajectory of the touch interaction based on a signal according to the touch interaction of the user. Also, the second layer may be a layer for displaying a content provided through an application or software or a content received from an external device connected with the electronic device 100. Other than the above, the second layer may be a layer for receiving a content displayed on the display of an external device by a mirroring method and displaying the content.

Meanwhile, the third layer is located on the second layer, and may have the same size as the second layer. However, the size of the third layer according to the disclosure is not limited to a case wherein it is the same as the size of the second layer. That is, according to an embodiment of the disclosure, the third layer may have a smaller size than the second layer, and may be located on some areas on the second layer.

Meanwhile, in case the first screen and the second screen as described above are displayed, a user may not only perform writing on the second screen, but also want to input a control command related to a content displayed on the second screen. Accordingly, the electronic device 100 according to an embodiment of the disclosure may operate in one of a first mode that may be referred to as a so-called 'writing mode,' or a second mode that may be referred to as a so-called 'manipulation mode.'

Specifically, based on a user instruction input while the second screen is displayed, the electronic device 100 may operate in one of the first mode for performing writing on the second screen according to a touch interaction input on the area wherein the second screen is displayed or the second mode for receiving a control command related to the content displayed on the second screen according to a touch interaction input on the area wherein the second screen is displayed.

In case the electronic device 100 operates in the first mode, the electronic device 100 may display writing on the second screen according to a touch interaction input on the area wherein the second screen is displayed. Meanwhile, the electronic device 100 according to an embodiment of the disclosure includes a first layer and a third layer for performing writing according to a touch interaction of a user on the first screen and the second screen, respectively.

Accordingly, if a touch interaction that started in one area between the area wherein the first screen is displayed and the area wherein the second screen is displayed is performed through another area while the electronic device 100 operates in the first mode, writing corresponding to the trajectory of the touch interaction may be displayed seamlessly on the first screen and the second screen.

Meanwhile, if a user instruction for moving the location of the second screen or for changing the size of the second screen is input, the locations or the sizes of the second layer and the third layer included in the second screen may be adaptively moved or changed according to the movement of the location of the second screen or the change of the size of the second screen.

Specifically, after writing corresponding to a touch interaction of a user is displayed on the second screen, if a user instruction for moving the location wherein the second screen is displayed to a different location is received, the electronic device 100 may move the location of the second layer and the location of the third layer according to the user instruction.

Also, after writing corresponding to a touch interaction of a user is displayed on the area wherein the second screen is displayed, if a user instruction for changing the size in which the second screen is displayed to a different size is received, the electronic device 100 may change the size of the second layer and the size of the third layer according to the user instruction.

Meanwhile, a controlling method of the electronic device 100 according to the aforementioned embodiments may be implemented as a program and provided to the electronic device 100. In particular, a program including a controlling method of the electronic device 100 may be provided while being stored in a non-transitory computer readable medium.

Specifically, in a computer readable recording medium including a program executing a controlling method of the electronic device 100, the controlling method of the electronic device 100 includes the steps of displaying a first screen including a first layer for performing writing according to a touch interaction of a user, and based on an event for displaying a content on the first screen occurring while the first screen is displayed, displaying a second screen including a second layer for displaying the content on the first layer and a third layer for performing writing according to a touch interaction of a user on the second layer on some areas of the first screen.

Here, a non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

According to an embodiment of the disclosure as described above, a user of the electronic device 100 may perform writing seamlessly on an entire screen of a display screen including an area for providing contents and the external area thereof.

In addition, even in case wherein a user changes the location or the size of an area for providing contents, the location or the size of writing displayed on the area for providing contents may also be adaptively changed.

Also, a user may freely input a control command related to a content through change of the operation mode of the electronic device 100, and in the case of performing writing through change of the operation mode again after inputting a control command, continuity with the previous writing can be maintained.

Further, in case a user wants to input a control command related to a content after writing is performed on an area for providing contents, the transparency of the writing displayed on the area for providing contents is changed, and thus the user can input a control command related to a content without interference of the writing.

In conclusion, according to the various embodiments of the disclosure, a user may be provided with an analog experience as if writing is performed on actual paper, and in accordance thereto, productivity of the user may be improved noticeably.

Each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner.

Operations performed by a module, a program, or other components according to the various embodiments may be executed sequentially, in parallel, repetitively, or heuristically. Or, at least some of the operations may be executed in a different order or omitted, or other operations may be added.

Meanwhile, the term "part" or "module" used in the disclosure includes a unit consisting of hardware, software, or firmware, and it may be interchangeably used with terms, for example, logic, a logical block, a component, or a circuit. Also, "a part" or "a module" may be a component consisting of an integrated body or a minimum unit performing one or more functions or a portion thereof. For example, a module may consist of an application-specific integrated circuit (ASIC).

The various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include an electronic device 100 according to the aforementioned embodiments (e.g.: an electronic device 100).

In case an instruction is executed by a processor, the processor may perform a function corresponding to the instruction by itself, or by using other components under its control. An instruction may include a code that is generated or executed by a compiler or an interpreter.

A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

According to an embodiment of the disclosure, the method according to the various embodiments described in the disclosure may be provided while being included in a computer program product. A computer program product refers to a product, and it can be traded between a seller and a buyer.

A computer program product can be distributed on-line in the form of a storage medium that is readable by machines (e.g.: a compact disc read only memory (CD-ROM)), or through an application store (e.g.: play Store™). In the case of on-line distribution, at least a portion of a computer program product may be stored in a storage medium such as the server of the manufacturer, the server of the application store, and the memory of the relay server at least temporarily, or may be generated temporarily.

Also, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
a display;
at least one memory configured to store at least one instruction; and
at least one processor configured to execute the at least one instruction,
wherein the at least one processor is configured to:
control the display to display a first screen, the first screen including a first layer configured to receive and display writing on the first layer according to a first touch interaction from a user, and
control the display to display a second screen, different from the first screen, on a partial area of the first screen, the second screen including:
a second layer displayed together with the first layer and configured to display content on the first screen, and
a third layer displayed together with the second layer and configured to receive and display writing on the third layer according to the first touch interaction from the user while displaying content of the second layer under the displayed writing on the third layer,
wherein the at least one processor is further configured to:
control the display to display the writing on the third layer represented as being displayed on the first screen and the second screen, based on the first touch interaction of the user for inputting the writing on the third layer starting in one of the first screen and the second screen and continuously input onto another one of the first screen and the second screen,
move, based on a user command for moving a first position of the second screen to a second position being received, the second layer and the third layer included in the second screen to the second position, the second screen corresponding to a screen currently displayed on a display of an external device connected to the electronic device, and image data corresponding to the second screen being received from the external device,
control the display to display, based on the electronic apparatus operating in an operation mode for receiving a control command related to the content of the second layer according to a second touch interaction on the second screen, the writing on the first layer and the writing on the third layer with a first transparency which is lower than a second transparency in which the content of the second layer according to the second touch interaction is displayed on the second screen, and
control the display to display, based on the electronic apparatus operating in a writing mode, the writing on the first layer and the writing on the third layer with a same transparency as the second transparency in which the content of the second layer according to the second touch interaction is displayed on the second screen.

2. The electronic apparatus of claim 1,
wherein the third layer has a same size as the second layer.

3. The electronic apparatus of claim 1,
wherein the electronic apparatus is further configured to receive a first user instruction, the first user instruction input while the second screen is displayed, and
based on the received first user instruction, operate in one of
the writing mode for receiving and displaying the writing on the third layer of the second screen according to the second touch interaction, the second touch interaction being input on the third layer of the second screen, or
the operation mode for receiving the control command related to the content displayed on the second layer of the second screen according to the second touch interaction, the second touch interaction input on the third layer of the second screen.

4. The electronic apparatus of claim 3,
wherein the at least one processor is further configured to:
receive a start of the second touch interaction on one of the first layer of the first screen and the third layer of the second screen while the electronic apparatus operates in the writing mode and an end of the second touch interaction on the other of the first layer of the first screen and the third layer of the second screen, and
control the display to display the writing on the first layer and the writing on the third layer corresponding to the second touch interaction on the first layer of the first screen and on the third layer of the second screen.

5. The electronic apparatus of claim 4,
wherein the at least one processor is further configured to:

receive a third user instruction to change a size of the second screen, and change a size of the second layer and a size of the third layer according to the received third user instruction.

6. The electronic apparatus of claim 5,
wherein the at least one processor is further configured to:
receive a fourth user instruction to change the size of the second screen while the electronic apparatus operates in the writing mode, and
change a size of the content displayed on the second layer and a size of the writing displayed on the third layer according to the received fourth user instruction.

7. The electronic apparatus of claim 3,
wherein the at least one processor is further configured to:
receive a fifth user instruction to operate the electronic apparatus in the operation mode while the electronic apparatus operates in the writing mode, and
control the display to change the second transparency of the writing displayed on the second screen according to the second touch interaction, the second touch interaction being input on the third layer of the second screen.

8. The electronic apparatus of claim 1, further comprising:
a communicator,
wherein the at least one processor is further configured to:
receive the content from an external apparatus through the communicator, and
control the display to process the received content as an image and display the image on the second layer.

9. A method of controlling an electronic apparatus, the method comprising:
performing, by at least one processor of the electronic apparatus, operations controlling a display of the electronic apparatus including:
control the display to display a first screen, the first screen including a first layer configured to receive and display writing on the first layer according to a first touch interaction from a user; and
control the display to display a second screen, different from the first screen, on a partial area of the first screen the second screen including:
a second layer displayed together with the first layer and configured to display content on the first screen, and
a third layer displayed together with the second layer and configured to receive and display writing on the third layer according to the first touch interaction from the user while displaying content of the second layer under the displayed writing on the third layer,
wherein the at least one processor of the electronic apparatus is further configured to:
control the display to display the writing on the third layer represented as being displayed on the first screen and the second screen, based on the first touch interaction of the user for inputting the writing on the third layer starting in one of the first screen and the second screen and continuously input onto another one of the first screen and the second screen,
move, based on a user command for moving a first position of the second screen to a second position being received, the second layer and the third layer included in the second screen are moved to the second position, the second screen corresponding to a screen currently displayed on a display of an external device connected to the electronic device, and image data corresponding to the second screen being received from the external device,
control the display to display, based on the electronic apparatus operating in an operation mode for receiving a control command related to the content of the second layer according to a second touch interaction on the second screen, the writing on the first layer and the writing on the third layer with a first transparency which is lower than a second transparency in which the content of the second layer according to the second touch interaction is displayed on the second screen, and
control the display to display, based on the electronic apparatus operating in a writing mode, the writing on the first layer and the writing on the third layer with a same transparency as the second transparency in which the content of the second layer according to the second touch interaction is displayed on the second screen.

10. The method of claim 9,
wherein the third layer has a same size as the second layer.

11. The method of claim 9, further comprising:
receiving a first user instruction that is input while the second screen is displayed, and
based on the first user instruction received, operating in one of
the writing mode for receiving and displaying the writing on the third layer of the second screen according to the touch interaction, the second touch interaction being input on the third layer of the second screen, or
the operation mode for receiving the control command related to the content displayed on the second layer of the second screen according to the second touch interaction, the second touch interaction being input on the third layer of the second screen.

12. The method of claim 11, further comprising:
receiving a start of the second touch interaction on one of the first layer of the first screen and the third layer of the second screen while the electronic apparatus operates in the writing mode and an end of the second touch interaction on the other of the first layer of the first screen and the third layer of the second screen, and
displaying the writing on the first layer and the writing on the third layer corresponding to the second touch interaction on the first layer of the first screen and on the third layer of the second screen.

13. The method of claim 12, further comprising:
receiving a third user instruction for changing a size in which the second screen is displayed to a different size, changing a size of the second layer and a size of the third layer according to the third user instruction received.

14. The method of claim 13,
wherein the changing comprises:
receiving a fourth user instruction to change the size of the second screen, and
changing a size of the content displayed on the second layer and a size of the writing displayed on the third layer according to the received fourth user instruction.

15. The method of claim 11, further comprising:
receiving a fifth user instruction to operate the electronic apparatus in the operation mode while the electronic apparatus operates in the writing mode, and
changing the second transparency of the writing displayed on the second screen according to the second touch interaction, the second touch interaction being input on the third layer of the second screen.

16. A non-transitory computer readable recording medium including a program to execute a method of an electronic apparatus, wherein the method of the electronic apparatus comprises performing, by at least one processor of the electronic apparatus, operations controlling a display of the electronic apparatus including:

control the display to display a first screen, the first screen including a first layer configured to receive and display writing on the first layer according to a first touch interaction from a user; and control the display to display a second screen, different from the first screen, on a partial area of the first screen, the second screen including:

a second layer displayed together with the first layer and configured to display content on the first screen, and a third layer displayed together with the second layer and configured to receive and display writing on the third layer according to the first touch interaction from the user while displaying content of the second layer under the displayed writing, wherein the at least one processor is further configured to:

control the display to display the writing on the third layer represented as being displayed on the first screen and the second screen, based on the first touch interaction of the user for inputting the writing on the third layer starting in one of the first screen and the second screen and continuously input onto another one of the first screen and the second screen, move, based on a user command for moving a first position of the second screen to a second position being received, the second layer and the third layer included in the second screen are moved to the second position, wherein, the second screen corresponding to a screen currently displayed on a display of an external device connected to the electronic device, and image data corresponding to the second screen being received from the external device, control the display to display, based on the electronic apparatus operating in an operation mode for receiving a control command related to the content of the second layer according to a second touch interaction on the second screen, providing the writing on the first layer and the writing on the third layer with a first transparency which is lower than a second transparency in which the content of the second layer according to the second touch interaction is displayed on the second screen, and control the display to display, based on the electronic apparatus operating in a writing mode, the writing on the first layer and the writing on the third layer with a same transparency as the second transparency in which the content of the second layer according to the second touch interaction is displayed on the second screen.

\* \* \* \* \*